United States Patent [19]

Anderson et al.

[11] Patent Number: 5,581,682

[45] Date of Patent: Dec. 3, 1996

[54] METHOD FOR STORING AND RETRIEVING ANNOTATIONS AND REDACTIONS IN FINAL FORM DOCUMENTS

[75] Inventors: Gerald B. Anderson; Brent P. Gross, both of Scarborough, Canada; James W. Marlin, Longmont, Colo.; Von D. Tucker, Roanoke, Tex.

[73] Assignee: International Business Machines Corporation, Armonk, N.Y.

[21] Appl. No.: 904,129

[22] Filed: Jun. 25, 1992

[30]     Foreign Application Priority Data

Jun. 28, 1991 [CA]   Canada .................................... 2045907

[51] Int. Cl.$^6$ ........................................................ G06F 17/24
[52] U.S. Cl. ............................................................ 395/792
[58] Field of Search ................................... 395/144, 145, 395/146, 148; 364/419.17, 419.18, 419.19

[56]                References Cited

U.S. PATENT DOCUMENTS

| | | | |
|---|---|---|---|
| 4,392,197 | 7/1983 | Couper et al. .......................... | 364/200 |
| 4,429,372 | 1/1984 | Berry et al. .............................. | 364/900 |
| 4,486,857 | 12/1984 | Heckel ...................................... | 364/900 |
| 5,107,423 | 4/1992 | Sasaki et al. ............................ | 364/419 |
| 5,140,521 | 8/1992 | Kozol et al. .............................. | 364/419 |
| 5,146,552 | 9/1992 | Cassorla et al. ......................... | 395/145 |
| 5,235,681 | 8/1993 | Masuzaki et al. ....................... | 395/164 |
| 5,239,466 | 8/1993 | Morgan et al. .......................... | 395/148 |
| 5,253,362 | 10/1993 | Nolan et al. ............................. | 395/600 |
| 5,255,364 | 10/1993 | Hirose ...................................... | 395/164 |

Primary Examiner—Mark K. Zimmerman
Assistant Examiner—Joseph H. Feild

[57]                    ABSTRACT

This invention is a method for annotating and redacting a final-form document archived in a computerized system where it is important that the fidelity of the final form document is preserved. More particularly, this method allows final-form documents containing objects such as texts, graphics and images to be annotated or redacted by other objects carried in the same data stream without compromising the integrity of the original document.

10 Claims, 7 Drawing Sheets

THE DALLAS SKYLINE, MADE FAMOUS BY THE CBS TELEVISION SHOW OF THE SAME NAME.

TEXAS, THE LARGEST STATE IN THE CONTINENTAL UNITED STATES, WAS ADMITTED TO THE UNION IN 1845. AGRICULTURE, OIL AND GAS, PETROCHEMICALS AND ELECTRONICS ARE ITS PRINCIPAL INDUSTRIES.

TEXAS HAS A DIVERSITY OF CLIMATES. THEY RANGE FROM THE ARID REGIONS IN THE HIGH PLAINS OF THE PANHANDLE TO THE SEMI-TROPICAL IN THE COASTAL AREAS.

FIG. 2B

DOCUMENT: HIGHEST LEVEL

| BEGIN DOCUMENT (BDT) | PAGE 1 | PAGE 2 | ... | PAGE n | END DOCUMENT (EDT) |

PAGE: INTERMEDIATE LEVEL

THE DALLAS SKYLINE, MADE FAMOUS BY THE CBS TELEVISION SHOW OF THE SAME NAME.

TEXAS, THE LARGEST STATE IN THE CONTINENTAL UNITED STATES, WAS ADMITTED TO THE UNION IN 1845. AGRICULTURE, OIL AND GAS, PETROCHEMICALS AND ELECTRONICS ARE ITS PRINCIPAL INDUSTRIES.

TEXAS HAS A DIVERSITY OF CLIMATES. THEY RANGE FROM THE ARID REGIONS IN THE HIGH PLAINS OF THE PANHANDLE TO THE SEMI-TROPICAL IN THE COASTAL AREAS.

| BEGIN PAGE (BPG) | IMAGE OBJECT | PRESENTATION TEXT OBJECT | GRAPHICS OBJECT | END PAG (EPG) |

FIG. 3A

THE DALLAS SKYLINE, MADE FAMOUS BY THE CBS TELEVISION SHOW OF THE SAME NAME.

TEXAS, THE LARGEST STATE IN THE CONTINENTAL UNITED STATES, WAS ADMITTED TO THE UNION IN 1845. AGRICULTURE, OIL AND GAS, PETROCHEMICALS AND ELECTRONICS ARE ITS PRINCIPAL INDUSTRIES.

WE SHOULD GET A BETTER MAP.

TEXAS HAS A DIVERSITY OF CLIMATES. THEY RANGE FROM THE ARID REGIONS IN THE HIGH PLAINS OF THE PANHANDLE TO THE SEMI-TROPICAL IN THE COASTAL AREAS.

THE DALLAS SKYLINE, MADE FAMOUS BY THE CBS TELEVISION SHOW OF THE SAME NAME.

TEXAS, THE LARGEST STATE IN THE CONTINENTAL UNITED STATES, WAS ADMITTED TO THE UNION IN 1845. AGRICULTURE, OIL AND GAS, PETROCHEMICALS AND ELECTRONICS ARE ITS PRINCIPAL INDUSTRIES.

THIS NEEDS A NICE COLOR PICTURE

WE SHOULD GET A BETTER MAP.

TEXAS HAS A DIVERSITY OF CLIMATES. THEY RANGE FROM THE ARID REGIONS IN THE HIGH PLAINS OF THE PANHANDLE TO THE SEMI-TROPICAL IN THE COASTAL AREAS.

METHOD FOR STORING AND RETRIEVING ANNOTATIONS AND REDACTIONS IN FINAL FORM DOCUMENTS

BACKGROUND OF THE INVENTION

Archiving documents electronically in a computer system is becoming widely accepted as an alternative to archiving documents in a paper based system. With an electronic system, an image of the information is captured and stored in digital form by scanning a paper copy of a document or by inputting the information through a keyboard. Once the information is stored, an image of it can be accessed for editing, reviewing or merging with other similar images, or overlaid by other information. Such systems therefore may make redundant the need to store, handle and process paper documents.

As with a paper based system, one requirement of electronic document archiving systems is that they must be able to store documents containing texts, graphics or images in a form that must not be altered once the documents have been processed to a certain state. Such documents are called final form documents, examples of which include insurance policies, credit card statements and cancelled cheques.

After these documents have achieved final form and are stored in the computer system, it is often necessary to be able to review them either on a computer screen or on paper. During reviews it may be desirable to add an annotation to the document or, prior to the review, blank out certain sections (redaction). In both instances, complete fidelity of the original document must be maintained without the inefficiency of making a copy of the document.

While it is relatively easy to create a system that will allow review of final form documents in electronic storage when changes are not necessary, it has not been as easy to implement a system that will permit annotations to the documents or to blank out sections during a review without changing the contents of the original document. In the prior art, systems which allow changes, such as annotations or redactions, are of two types. First, those systems which have a facility to edit the document, i.e, add or delete information or, second, systems which allow the merging of two files where one file contains the unchanged final form document and the other file contains the annotation. As a result of the merge, the annotation is overlaid on the original document.

In systems which allow editing, the reviewer is changing the document and saving the changes with the original document. In this method the original information may be altered and it may not be easy to distinguish the original information from the added information. Consequently, the objective of creating and maintaining the integrity of a final form document is defeated. In the alternative method, using merging and overlays, annotation is achieved by linking the-final form document to another file containing the added information. With this method, while the final form document is unchanged, there is a need to manage a database containing the annotations separate from the final form document as well as to maintain the links. As the size of the archive increases, managing this system can become a problem. Hence, neither editing nor maintaining a system with a separate data base and links will provide an efficient and cost effective means to annotate or blank out sections of final form documents when large numbers of documents are involved.

Annotation and redaction requirements for digital final form documents are analogous to those found in paper based systems. Common forms of annotating and redacting paper documents are: i) writing directly on a copy of the document, ii) attaching a note to a page using, for example, a Post-It. type note or iii) highlighting areas of a copy of the page with a transparent or opaque marker. If an annotation is attached to the page overlaying the document, the reviewer may not be able to see the underlying part of the document unless the annotation can be lifted up. Similarly, if an opaque highlighter is used, that section of the document may be obscured. Further, in some documents, a reviewer may wish to annotate a previous annotation, or different reviewers may add multiple annotations. Or, where many reviewers are involved, it may be desirable to hide some of the annotations or restrict access to view certain annotations. The end result is that an annotated final form document may have a series of annotations to which there is a hierarchy of access to each annotation.

SUMMARY OF THE INVENTION

The present invention embodies a method to store and retrieve final form documents which not only maintains the document's integrity but also overcomes the difficulties and inconvenience encountered in using an editor or merging and overlaying two files using links to an external file. With this invention, the concept of overlaying is applied but is extended to allow objects representing an annotation or redaction on a final form document to be merged in the same data stream as the final form document. As a result, there is no need for external data links as the information is in the same data stream. Multiple annotations using various objects such as texts, images or graphics are allowed. It is relatively easy to assign a hierarchy of access to different annotations and annotations can be selectively added or peeled back to reveal the final form page and selective redactions can be applied either to the final form text or to an annotation.

With this invention, the reviewer may add notes or comments to the document at specific locations and save the annotations for a subsequent review at the same location where it was originally placed. With redaction, portions of the original document may be masked either as it is being reviewed or before it was received for review. With both annotation and redaction, the contents of the original, underlying document as archived is not changed. However, a reviewer may see either the original document or the document with the annotations or redacted sections included.

DESCRIPTION OF THE PREFERRED EMBODIMENT

This invention uses the overlay function but has added a "conditional processing" structure to allow annotation of final form objects without changing the contents. It consists of two pieces: first the overlay part containing the annotation and the redaction and, second, the use of an "include structure" for every referenced object that has to be brought into the document.

The concept of overlays is well known to those familiar with this subject, however what is new is the concept of conditional processing with the include structure.

Figure 1:
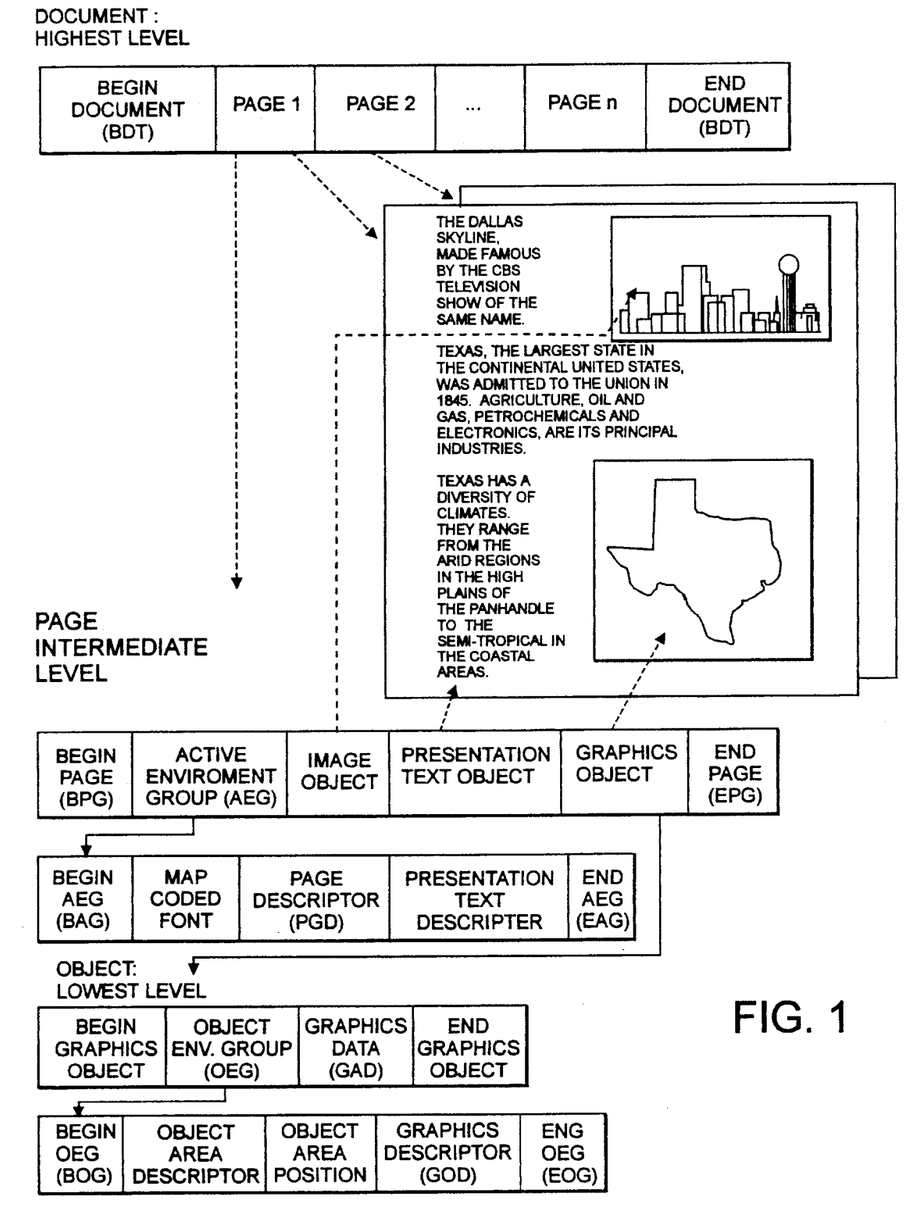
FIG. 1 illustrates a document as structured in the Prior Art.

In the IBM publication titled: Data Stream and Object Architectures, *Mixed Object Document Content Architecture Reference*, Publication Number SC31-68002, documents are structured as shown in FIG. 1. In this architecture, each document is identified with a begin and an end command. Within the document, each page is identified by a begin and an end command and within each page, an object is identified by a begin and end command. The objects in each page may be of various kinds, for example text, graphics, image, a bar code or audio images. The location of each object within the page is defined by a grid system. An "include page control" command is located within each page to identify the location of any additional objects that have been added to the original page.

FIG. 1 illustrates how a document is structured in the prior art. As shown in FIG. 1, the first element of the page command defines an active environmental group. This group provides some general information on how the objects are to be presented. For example, one part of the active environmental group is a Map Code font which indicates the type font that is to be used on the page. As the active environmental group forms no part of the present invention, it will not be further described. However, a full description of the document Architecture so far described can be found in the IBM Publication Number SC31-6802 referenced above.

Within the data stream as shown in FIG. 1, the page structure is further defined. In the specific example shown in FIG. 1, the page consists of an Image Object, a Presentation Object and a Graphics Object. Each of these objects is defined within the data stream as is further shown with respect to the Graphics Object in FIG. 1.

The present invention builds upon this data stream by adding an include structure within the page portion of the data stream. On the include structure there is a conditional processing triplet which identifies and classifies the object as either an annotation or a redaction object. When an image representing a page of the document is to be annotated, a reference to the overlay is created in the include structure and there may be more than one include structure per page as one include structure is required for each annotation. With the current final form overlays, each annotation is stored as a separate data object in a library which is referenced from within the final form documents. When the final form document is presented, the referenced object is retrieved and merged with the specific data page. Overlays are then positioned on the page based on coordinate data contained in the overlay reference.

Each component of a mixed object document is explicitly defined and delimited in the data stream that transmits it. This is accomplished through the use of a data structure called structured fields that reside in the data stream. Structured fields are used to envelope document components and to provide commands and information to applications using the data stream. Structured fields may contain one or more parameters. Each parameter provides one value from a set of values defined by the architecture.

Triplets appear after all fixed parameters in a structured field. Repeating groups of triplets may be contained within a single structured field.

The triplet itself is a self-identifying parameter and contains three components. The first component specifies the length of the triplet, the second component identifies the triplet and the third component identifies the parameters associated with the triplet. For page overlay conditional processing, which is the subject of the present invention, the triplet identifies the intended use of the page overlay as it is produced by an overlay generator. The triplet also can define an overlay level that determines whether the overlay is to be processed. The syntax of a suitable conditional overlay might be as follows:

| NAME | VALUES | MEANING |
| --- | --- | --- |
| Tlength | 3–4 | Length of the triplet, including Tlength |
| Tid | X'46' | Identifies the triplet as the Page Overlay Conditional Processing Triplet |
| Pg Ov Type | | Specifies the page overlay type |
| | X'00' | Type 0 - Normal |
| | X'01' | Type 1 - Annotation |
| | X'02 | Type 2 - Redaction |
| Level | X'01'–X'FE' | The level of the overlay |

With this triplet, the overlay can be conditionally processed which enables the advantage of the present invention to be attained. The Page Overlay Type (Pg Ov Type) specifies how the overlay is to be used. In the example, two overlay types are indicated, Type 0 and Type 1. If no conditional processing is intended then Type 0 would be selected and the page overlay would be processed as a normal overlay. If conditional processing were required then Type 1 would be selected to indicate that the page overlay is an annotation or redaction overlay used to indicate changes or annotations or redactions to the contents of the page to which it applies.

The level portion of the triplet specifies the processing level of the overlay. The overlay level determines whether a particular application is to process the overlay. The level triplet is compared to one contained within the application being invoked and, if it is equal or lower than the application level, the overlay is processed. Otherwise, the overlay is not performed.

Figure 5:
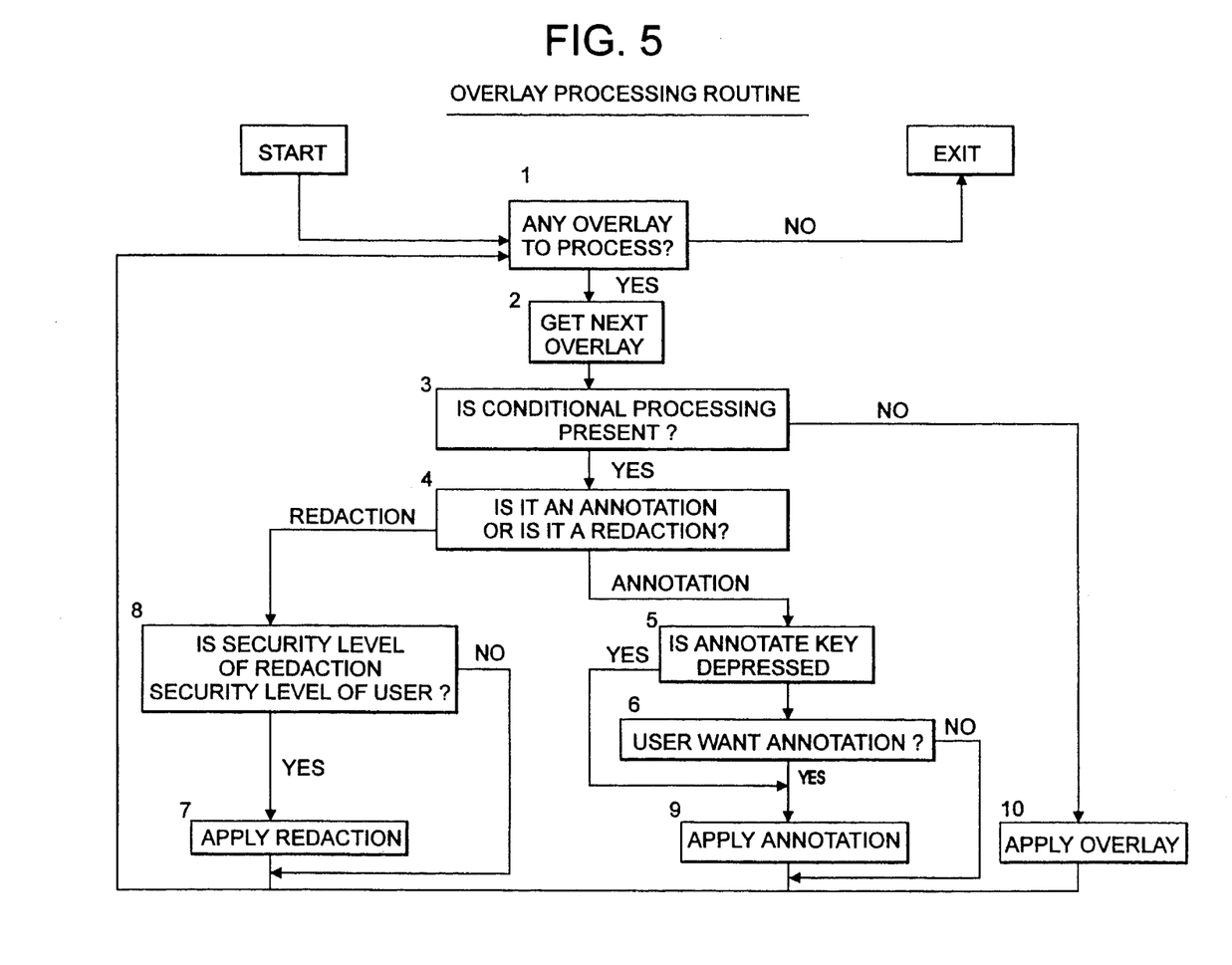
FIG. 5 is a control Flow Chart of the Overlay Processing Routine.

FIG. 5 is a control flowchart of a system designed to implement a preferred embodiment of the invention. The portion of the system illustrated in FIG. 5 is the overlay processing routine. Block 1 is the entry point to the routine. At block 1, which is a decision block, the system searches the data stream for additional overlays; if the data stream does contain additional overlays, the system moves to block 2. In action block 2, the system gets the next overlay. The system then proceeds to decision block 3, in which the system checks for a conditional processing triplet which is found at the beginning of the overlay. If the triplet is a conditional processing triplet, the system searches for the next byte which identifies whether the overlay is an annotation or a redaction in decision block 4. If the overlay is an annotation, the system moves to decision block 5 to determine whether the user has pressed a key indicating that he wishes to view the annotations. If the user has pressed the key, the system skips to block 7. If the user has not pressed a key, the system proceeds to decision block 6. In decision block 6, the system examines the default value that the user has established to determine whether he wishes to view annotations or not. If the user wishes to view annotations, his default value will so indicate and the system will proceed to block 7. If the user does not wish to view annotations, then the system will skip past block 7. In action block 7, the system applies the annotation to the document as will be understood by the person skilled in the art.

Returning to decision block 4, if the overlay is a redaction, the system proceeds to decision block 8. In decision block 8, the system examines the security level of the redaction and compares it to the security level of the user, which is already known to the system. If the redaction security level exceeds that the of user, the system determines that the user does not have the authority to view the document prior to the redaction and proceeds to action block 9, in which the system applies the redaction to the document. If, on the other hand, the security level of the redaction does not exceed the security level of the user, then the system skips block 9 and does not apply the redaction to the document.

Returning to decision block 3, if the triplet in the second field of the overlay is not a conditional processing triplet, because the overlay is neither an annotation or a redaction, the system proceeds to block 10 and applies the overlay in a manner known to a person skilled in the art.

At this point, the system returns to block 1 in order to process any additional overlays that may be found in the current page of the document. When there are no additional overlays to be processed, the system exits the overlay processing routine. It then proceeds to handle the next portion of the document in a manner known to a person skilled in the art.

It will be apparent to the person skilled in the art that in one implementation, block 6 in FIG. 5 can be a state register which contains a particular value if the user default is set to view annotations, and which contains a different value if the user default is set not to view annotations. Further, in one preferred embodiment, block 1 of FIG. 5 can be a ripple-through buffer, enabled to process overlay items individually and sequentially. Alternatively, block 1 can be implemented in another preferred embodiment of the invention as a step in a software program. Further, it will be clear to the person skilled in the art that the invention can be implemented entirely in either a hardware embodiment or a software embodiment. The skilled person will choose the type of embodiment according to considerations that are common in computer systems, for example cost and ability to modify the system at a future date.

The method of the invention uses the forms overlay structures in order to store the data. The reference structure within the document is extended to contain specific information describing the referenced object as an annotation object, and providing an annotation level associated with this object. The overlay object is extended to provide the control information specifying whether this overlay is to be merged in a transparent or opaque manner when applying the page. Since annotation overlays usually apply to a single page, as opposed to form overlays which are typically applicable to all instances of a particular page type, the overlays are contained within the structure of the page to which they apply, removing the need to manage the annotation.

Figure 2A:
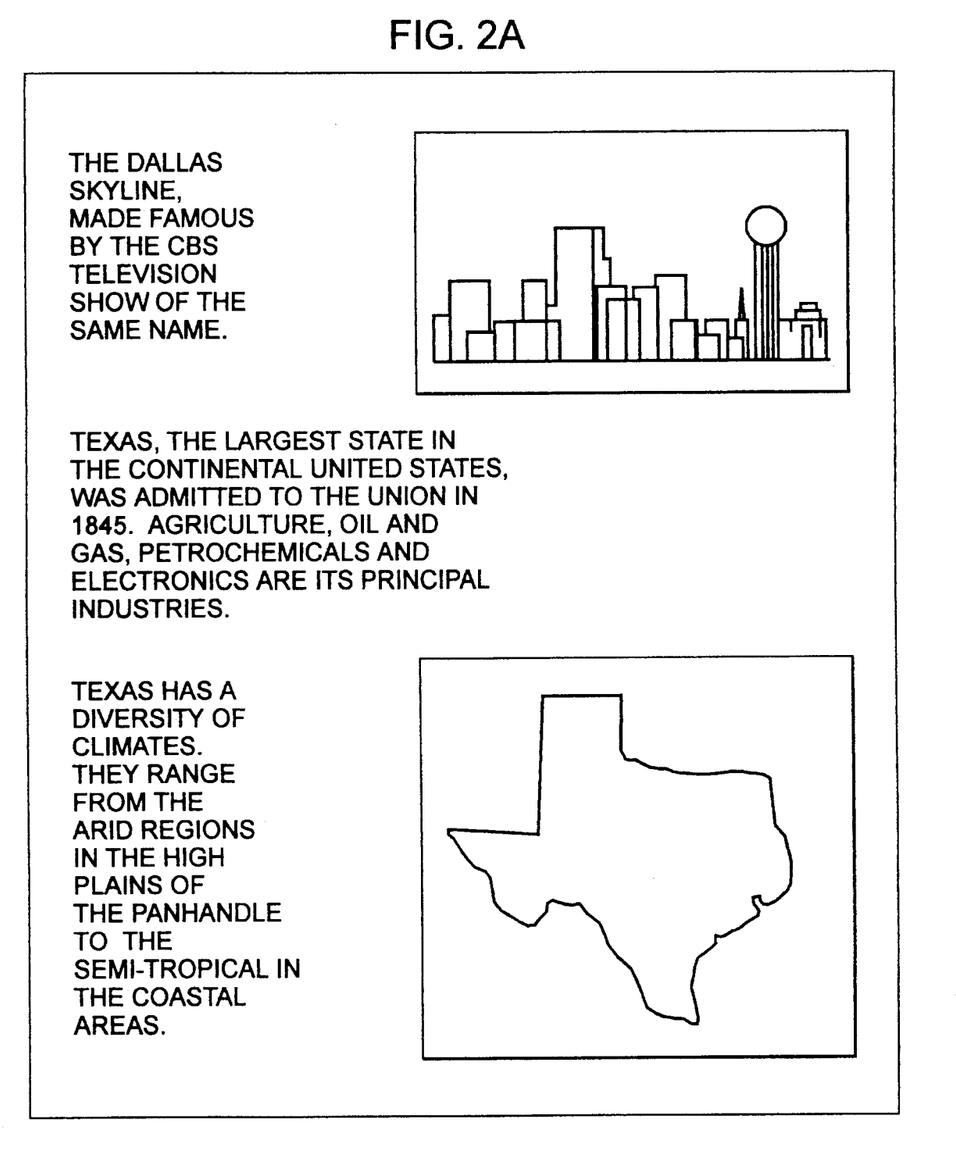
FIG. 2A illustrates a page of a Final Form document.
Figure 2B:
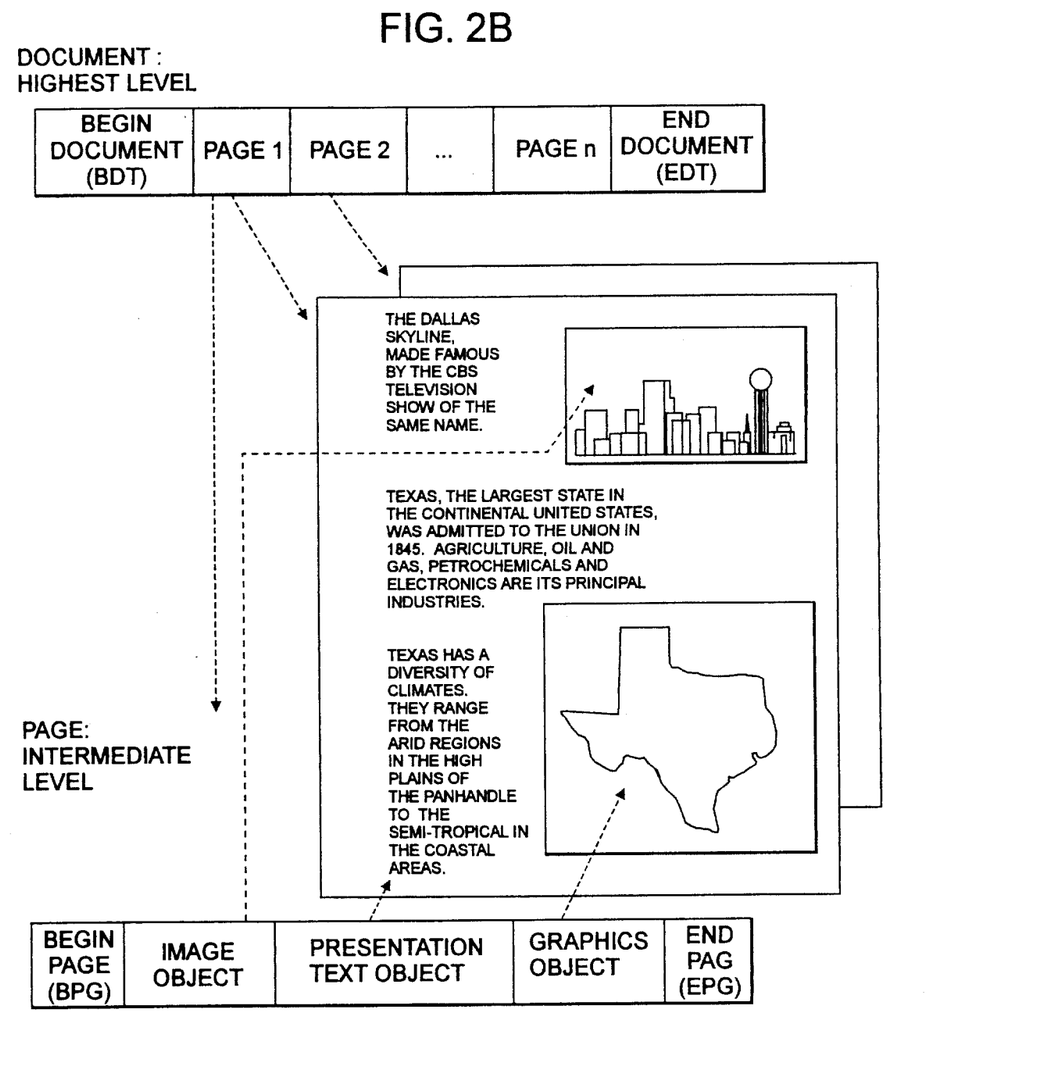
FIG. 2B shows the representation of a Final Form document with its associated data stream.
Figure 3A:
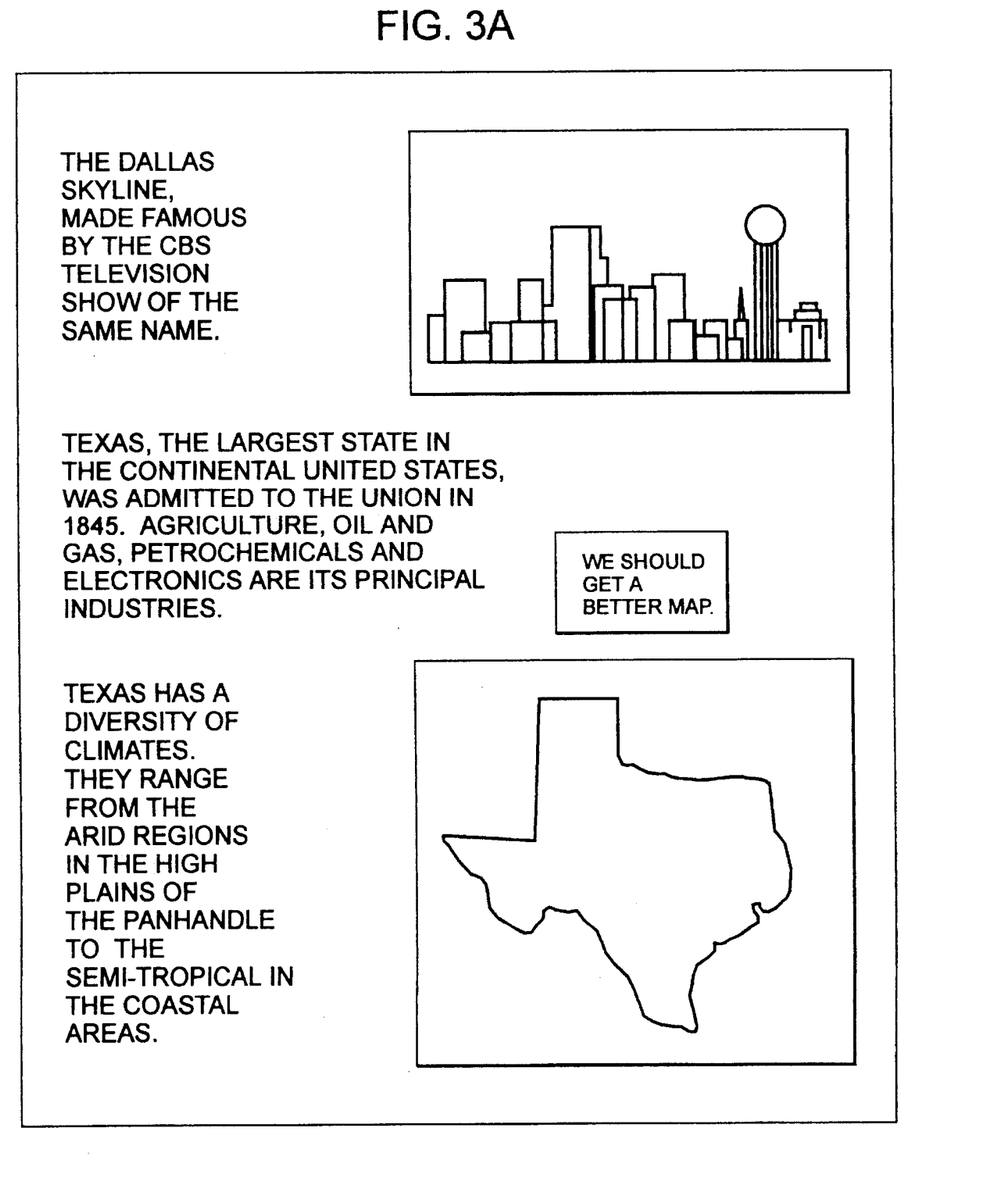
FIG. 3A illustrates a page of a Final Form document with one annotation.
Figure 3B:
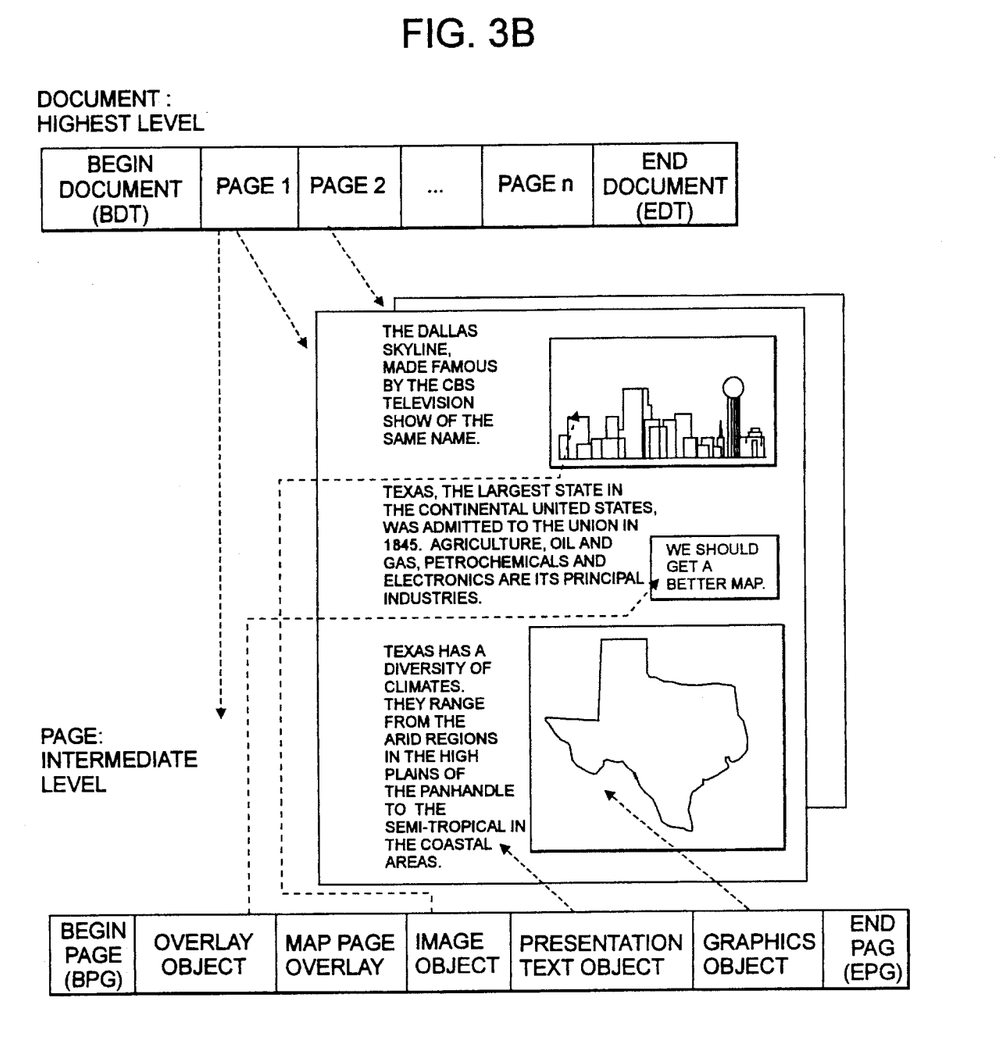
FIG. 3B shows an annotated Final Form Document with its associated data stream.
Figure 4:
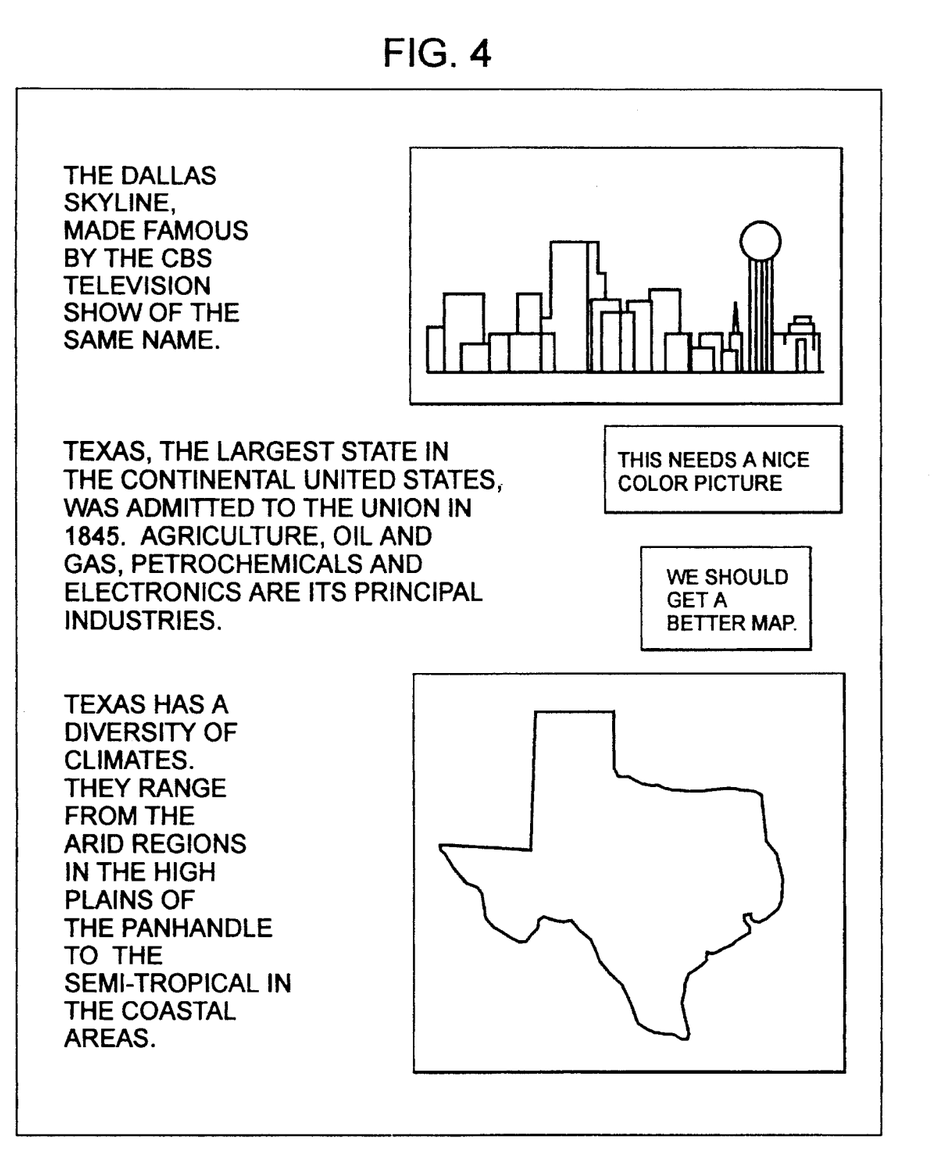
FIG. 4 shows a document with two annotations.

An example of how this invention works may be seen by comparing FIGS. 2A, 2B and Table 1, with FIGS. 3A, 3B and Table 2, and with FIG. 4 and Table 3. Assume in FIG. 2A, we have a page consisting of a text object (a description of Dallas and Texas), an image object (the Dallas skyline) and a graphics object (the Texas map). Assume also that this is a final form page on which we wish to add an annotation without changing the objects in the document. Considering only the text object, the data stream representation of the text object is shown in Table 1 (the data stream representation of the other two objects are omitted). Suppose now that a reviewer wishes to add the annotation "We should get a better map." as shown in the box. To do this, the software application program which allows the reviewer to access and view the document will, through a command entry or a pull down menu, give the user the option to specify the characteristics and content of the annotation. This may include font, location, size or orientation of the annotation on the final form document. Once this is specified and entered into the system, the annotation will be as shown on FIGS. 3A and 3B and the corresponding data stream will be as shown in Table 2. In Table 2, the data stream for the unannotated text from Table 1 is included from the location of Offset number 149. The key difference between the data streams in Table 1 and that shown in Table 2 is that from the location of Offset number 149 onwards in Table 2, a pointer, "Map Page Overlay", is included as Offset number 151. The Map Page Overlay is the instruction to include the annotation previously created at the desired location on the final form document.

To add a second annotation to the page, for example, "This needs a nice color picture", while retaining the first annotation, the process described above is repeated and the data stream is modified in a similar manner. The result is FIG. 4 which shows the additional annotation and Table 3 which shows the modified data stream. In Table 3, the addition to the data stream is shown above Offset number 131. The relative location of the objects in the data stream is determined by the architecture of the data stream as described in the IBM Publication Number SC31-68002 referred to above.

In a similar manner, other annotations and objects may be added to the data stream. The result is that the data stream for the final form object remains unchanged, however the file containing the final form document and the annotations is expanded as each annotation is added. With this invention there is no requirement to edit the final form document, nor to merge annotations using different linked files.

While the invention has been described with reference to a preferred embodiment, it will be understood by those skilled in the art that various changes can be made to the architecture without departing from the spirit and scope of the invention. Accordingly, the invention shall be limited only as specified in the following claims.

TABLE I

| Offset | Len | Format | Name | Description |
| --- | --- | --- | --- | --- |
| 0 | 1d | d3a8a8000000 | MODCA BDT | Begin document |
| 1d | 8 | d3a8af000000 | MODCA BPG | Begin page |
| 25 | 8 | d3a8c9000000 | MODCA BAG | Begin Active Environment |
| 2d | 17 | d3a6af000000 | MODCA PGD | Page Descriptor |
| 44 | 8 | d3a9c9000000 | MODCA EAG | End Active Environment |

TABLE I-continued

| Offset | Len | Format | | Name | Description |
|---|---|---|---|---|---|
| 4c | 8 | d3a8fb000000 | MODCA | BIM | Begin Image |
| 54 | 8 | d3a8c7000000 | MODCA | BOG | begin Object environment group |
| 5c | 1c | d3a66b000000 | MODCA | OBD | Object Area Descriptor |
| 78 | 20 | d3ac6b000000 | MODCA | OBP | Object Area Position |
| 98 | 15 | d3a6fb000000 | MODCA | IDD | Image Data Descriptor |
| ad | 8 | d3a9c7000000 | MODCA | EOG | end Object environment group |
| b5 | 1ffc | d3eefb000000 | MODCA | IPD | Image Picture Data |
| 20b1 | 1f85 | d3eefb000000 | MODCA | IPD | Image Picture Data |
| 4036 | 8 | d3a9fb000000 | MODCA | EIM | End Image |
| 403e | 8 | d3a9af000000 | MODCA | EPG | End page |
| 4046 | 10 | d3a9a8000000 | MODCA | EDT | End document |

TABLE II

| Offset | Len | Format | | Name | Description |
|---|---|---|---|---|---|
| 0 | 1d | d3a8a8000000 | MODCA | BDT | Begin document |
| 1d | 8 | d3a8af000000 | MODCA | BPG | Begin page |
| 25 | 8 | d3a8c6000000 | MODCA | BRG | Begin Resource Group |
| 2d | 10 | d3a8df000000 | MCDCA | BMO | Begin Overlay |
| 3d | 8 | d3a8c9000000 | MODCA | BAG | Begin Active Environment |
| 45 | 1a | d3ab8a000000 | MODCA | MCF | Map Coded Font |
| 5f | 1a | d3a6af000000 | MODCA | PGD | Page Descriptor |
| 79 | 16 | d3b19b000000 | MODCA | PTD | Presentation Text Data Descriptor |
| 8f | 8 | d3a9c9000000 | MODCA | EAG | End Active Environment |
| 97 | 8 | d3a89b000000 | MODCA | BPT | Begin Presentation Text |
| 9f | 8a | d3ee9b000000 | MODCA | PTX | Presentation Text Data |
| 129 | 8 | d3a99b000000 | MODCA | EPT | End Presentation Text |
| 131 | 10 | d3a9df000000 | MODCA | EMO | End Overlay |
| 141 | 8 | d3a9c6000000 | MODCA | ERG | End Resource Group |
| 149 | 8 | d3a8c9000000 | MODCA | BAG | Begin Active Environment |
| 151 | 1a | d3abd8000000 | MODCA | MPO | Map Page Overlay |
| 16b | 17 | d3a6af000000 | MODCA | PGD | Page Descriptor |
| 182 | 8 | d3a9c9000000 | MODCA | EAG | End Active Environment |
| 18a | 8 | d3a8fb000000 | MODCA | BIM | Begin Image |
| 192 | 8 | d3a8c7000000 | MODCA | BOG | begin Object environment group |
| 19a | 1c | d3a66b000000 | MODCA | OBD | Object Area Descriptor |
| 1b6 | 20 | d3ac6b000000 | MODCA | OBP | Object Area Position |
| 1d6 | 15 | d3a6fb000000 | MODCA | IDD | Image Data Descriptor |
| 1eb | 8 | d3a9c7000000 | MODCA | EOG | end Object environment group |
| 1f3 | 1ffe | d3eefb000000 | MODCA | IPD | Image Picture Data |
| 21ef | 1f85 | d3eefb000000 | MODCA | IPD | Image Picture Data |
| 4174 | 8 | d3a9fb000000 | MODCA | EIM | End Image |
| 417c | 1e | d3afd8000000 | MODCA | IPO | Include Page Overlay |
| 419a | 8 | d3a9af000000 | MODCA | EPG | End page |
| 41a2 | 10 | d3a9a8000000 | MODCA | EDT | End document |

TABLE III

| Offset | Len | Format | | Name | Description |
|---|---|---|---|---|---|
| 0 | 1d | d3a8a8000000 | MODCA | BDT | Begin document |
| 1d | 8 | d3a8af000000 | MODCA | BPG | Begin page |
| 25 | 8 | d3a8c6000000 | MODCA | BRG | Begin Resource Group |
| 2d | 10 | d3a8df000000 | MCDCA | BMO | Begin Overlay |
| 3d | 8 | d3a8c9000000 | MODCA | BAG | Begin Active Environment |
| 45 | 1a | d3ab8a000000 | MODCA | MCF | Map Coded Font |
| 5f | 1a | d3a6af000000 | MODCA | PGD | Page Descriptor |
| 79 | 16 | d3b19b000000 | MODCA | PTD | Presentation Text Data Descriptor |
| 8f | 8 | d3a9c9000000 | MODCA | EAG | End Active Environment |
| 97 | 8 | d3a89b000000 | MODCA | BPT | Begin Presentation Text |
| 9f | 8a | d3ee9b000000 | MODCA | PTX | Presentation Text Data |
| 129 | 8 | d3a99b000000 | MODCA | EPT | End Presentation Text |
| 131 | 10 | d3a9df000000 | MODCA | EMO | End Overlay |
| 141 | 10 | d3a8df000000 | MODCA | BMO | Begin Overlay |
| 151 | 8 | d3a8c9000000 | MODCA | BAG | Begin Active Environment |

TABLE III-continued

| Offset | Len | Format | Name | Description |
| --- | --- | --- | --- | --- |
| 159 | 1a | d3ab8a000000 | MODCA | MCF | Map Coded Font |
| 173 | 1a | d3a6af000000 | MODCA | PGD | Page Descriptor |
| 18d | 16 | d3b19b000000 | MODCA | PTD | Presentation Text Data Descriptor |
| 1a3 | 8 | d3a9c9000000 | MODCA | EAG | End Active Environment |
| 1ab | 8 | d3a89b000000 | MODCA | BPT | Begin Presentation Text |
| 1b3 | 7d | d3ee9b000000 | MODCA | PTX | Presentation Text Data |
| 230 | 8 | d3a99b000000 | MODCA | EPT | End Presentation Text |
| 238 | 10 | d3a9df000000 | MODCA | EMO | End Overlay |
| 248 | 8 | d3a9c6000000 | MODCA | ERG | End Resource Group |
| 250 | 8 | d3a8c9000000 | MODCA | BAG | Begin Active Environment |
| 258 | 1a | d3abd8000000 | MODCA | MPO | Map Page Overlay |
| 272 | 1a | d3abd8000000 | MODCA | MPO | Map Page Overlay |
| 28c | 17 | d3a6af000000 | MODCA | PGD | Page Descriptor |
| 2a3 | 8 | d3a9c9000000 | MODCA | EAG | End Active Environment |
| 2ab | 8 | d3a8fb000000 | MODCA | BIM | Begin Image |
| 2b3 | 8 | d3a8c7000000 | MODCA | BOG | begin Object environment group |
| 2bb | 1c | d3a66b000000 | MODCA | OBD | Object Area Descriptor |
| 2d7 | 20 | d3ac6b000000 | MODCA | OBP | Object Area Position |
| 2f7 | 15 | d3a6fb000000 | MODCA | IDD | Image Data Descriptor |
| 30c | 8 | d3a9c7000000 | MODCA | EOG | end Object environment group |
| 314 | 1ffc | d3eefb000000 | MODCA | IPD | Image Picture Data |
| 2310 | 1f85 | d3eefb000000 | MODCA | IPD | Image Picture Data |
| 4295 | 8 | d3a9fb000000 | MODCA | EIM | End Image |
| 429d | 1e | d3afd8000000 | MODCA | IPO | Include Page Overlay |
| 42bb | 1e | d3afd8000000 | MODCA | IPO | Include Page Overlay |
| 42d9 | 8 | d3a9af000000 | MODCA | EPG | End page |
| 42e1 | 10 | d3a9a8000000 | MODCA | EDT | End document |

We claim:

1. A method for storing documents and information associated with said documents, said method comprising the steps of:

converting a document to a document data stream, said document data stream comprised of document data and a plurality of structured fields;

converting information associated with said document to an information data stream;

combining said document data stream with said information data stream to form a combined data stream, leaving said document data in said combined data stream unchanged;

modifying at least one of said structured fields in said combined data stream by adding an include structure to indicate that said information data stream has been included in said combined data steam; and storing said combined data stream.

2. A method as in claim 1 wherein a first of said structured fields is associated with a first portion of said information data stream, and said first structured field indicates whether said first portion of said information data stream is an annotation of said document data stream or a redaction of said document data stream.

3. A method as in claim 1 wherein:

a first group of said plurality of structured fields comprises a plurality of "begin flags", each of said flags indicating the beginning of a portion of said document data stream corresponding to the beginning of a portion of said document;

a second group of said plurality of said structured fields comprises a plurality of "end flags", each of said end flags indicating the end of a portion of said document data stream corresponding to the end of a portion of said document;

a third group of said plurality of structured fields being "indicator flags", each of said indicator flags being associated with one of said beginning flags and one of said end flags, said indicator flags indicating specific conditions; and said modification of at least one of said structured fields comprising modifying a first of said indicator flags, said first indicator flag being associated with a first of said beginning flags and a first of said end flags, said modified indicator flags indicating that a first portion of said information data stream is to be associated with said portion of said document data stream corresponding to said first beginning flag and said first end flag.

4. A method as defined in claim 3 wherein said modified first indicator flag additionally indicates a security level of said first portion of said information data stream.

5. A method as defined in claim 3 wherein said modified indicator flags additionally indicate the location of said associated information within said first portion of said information data stream.

6. An apparatus for associating information with a stored document, said apparatus comprising:

means for converting a document to a document data stream, said document data stream comprised of document data and a plurality of structured fields;

means for converting information associated with said document to an information data stream;

means for combining said document data stream with said information data stream to form a combined data stream, leaving said document data in said combined data stream unchanged;

means for modifying at least one of said structured fields in said combined data stream by adding an include structure to indicate that said information data stream has been included in said combined data steam; and means for storing said combined data stream.

7. An apparatus as in claim 6 wherein a first of said structured fields is associated with a first portion of said information data stream and said first structured field indicates whether said first portion of said information data stream is an annotation of said document data stream or a redaction of said document data stream.

8. An apparatus as in claim 6 wherein:

a first plurality of structured fields comprises a plurality of "begin flags", each of said begin flags indicating the beginning of a portion of said document data stream corresponding to the beginning of a portion of said document:

a second group of said plurality of said structured fields comprises a plurality of "end flags", each of said end flags indicating the end of a portion of said document data stream corresponding to the end of a portion of said document;

a third group of said plurality of structured fields being "indicator flags", each of said indicator flags being associated with one of said beginning flags and one of said end flags, said indicator flags indicating specific conditions; and said modification of at least one of said structured fields comprising modifying a first of said indicator flags, said first indicator flag being associated with a first of said beginning flags and a first of said end flags, said modified indicator flags indicating that a first portion of said information data stream is to be associated with said portion of said document data stream corresponding to said first beginning flag and said first end flag.

9. An apparatus as in claim 8 wherein said modified indicator flags additionally indicate the security level of said information.

10. An apparatus as in claim 8 wherein said modified indicator flags additionally indicate the location of said associated information within said first portion of said document.

* * * * *